United States Patent [19]

Baugh et al.

[11] Patent Number: 4,854,746

[45] Date of Patent: Aug. 8, 1989

[54] CRANKSHAFT BEARING CAP LOCATION SCHEME

[75] Inventors: James D. Baugh, Greensburg; Francis M. Hager, Columbus, both of Ind.

[73] Assignee: Cummins Engine Company, Inc., Columbus, Ind.

[21] Appl. No.: 749,742

[22] Filed: Jun. 28, 1985

[51] Int. Cl.$^4$ .............................................. F16C 35/02
[52] U.S. Cl. ..................................... 384/432; 384/434
[58] Field of Search ............... 384/434, 273, 288, 294, 384/432, 433; 277/221, 220

[56] References Cited

U.S. PATENT DOCUMENTS

| | | | |
|---|---|---|---|
| 793,623 | 6/1905 | Bowen | 277/221 |
| 2,560,413 | 7/1981 | Carlson . | |
| 2,588,666 | 3/1952 | Slemmons . | |
| 2,997,347 | 8/1961 | Bauer . | |
| 3,304,134 | 2/1967 | Allen . | |
| 4,093,322 | 6/1978 | Koskuba | 384/434 |
| 4,189,193 | 2/1980 | Schumacher . | |
| 4,209,209 | 6/1980 | Stark . | |

FOREIGN PATENT DOCUMENTS 0076474 9/1982 European Pat. Off. .
1026128 3/1958 Fed. Rep. of Germany .
2394678 1/1979 France .
226288 3/1943 Switzerland .

Primary Examiner—Lenard A. Footland
Attorney, Agent, or Firm—Sixbey, Friedman, Leedom & Ferguson

[57] ABSTRACT

An improved bearing assembly which may only be assembled when its principle components are properly fitted together is disclosed herein. Generally, the bearing assembly includes a saddle member and a bearing cap, each of which includes a main bearing receiving, semi-circular recess for journaling the crankshaft of an internal combustion engine. The recess of the saddle member is flanked on either side by first and second alignment slots, and the recess of the bearing cap is flanked by first and second mounting shoulders which are asymmetrical in shape with respect to the axis of rotation of the semi-cylindrical recess, and which are insertable within the first and second alignment slots of the saddle member, respectively. However, dissymmetry between the first and second shoulders prohibit the first shoulder from being inserted into the second alignment slot in a manner to cause proper alignment of the semi-cylindrical recesses. In the preferred embodiment, the shoulders are both generally rectangular in shape, with one shoulder being longer than the other.

11 Claims, 3 Drawing Sheets

CRANKSHAFT BEARING CAP LOCATION SCHEME

TECHNICAL FIELD

This invention relates to an improved saddle member and bearing cap for journaling the crankshaft of an internal combustion engine.

BACKGROUND ART

Various bearing assemblies for journaling the crankshaft within an internal combustion engine are known in the prior art. One of the most common types of such bearing assemblies generally includes a saddle member which is often integrally formed within the block of the engine, and a bearing cap which may be mounted over the saddle member. Both the saddle member and the bearing cap each include semi-cylindrical recesses of the same diameter, so that when the cap is bolted or otherwise mounted over the saddle member with the crankshaft captured therebetween, a cylindrical surface is formed which effectively journals the crankshaft in a running fit.

One of the primary advantages of such a bearing structure is that it allows the crankshaft to be removed from the engine block when it becomes necessary to replace the shaft, or perform other maintenance operations within the engine. Unfortunately, it has proven difficult to design a saddle and cap type bearing assembly which may be disassembled and reassembled repeatedly without some misalignment occurring between the abutting edges of the semicircular recesses in the saddle member and the bearing cap. The tolerances at the points of abuttment between the two semi-circular recesses are very narrow, and even small misalignments on the order of a few ten thousands of an inch can result in an engine which performs separately noisier and rougher. Worst still, such misalignments often accelerate the wear of the crankshaft, and reduce the reliability of the engine as a whole. Such unreliability is particularly unacceptable in the diesel engines used in the trucking industry, where unexpected engine downtimes may be very costly.

The prior art has a tendency to solve this misalignment problem in several ways. For example, in some bearing assemblies, vertical location surfaces are provided along the edges of the bearing cap which are engageable with guide surfaces present on either side of the semi-cylindrical alignment slot of the saddle member. When the locating surface to the bearing cap are captured within the guide surfaces of the alignment slots, the bearing cap is prohibited from moving transversely relative to the saddle member. Still another solution has been the provision of stepped contacting faces on either end of the bearing cap which are mateable within stepped alignment slots in the saddle member. In a variation of this same concept, serrated mating faces or meshing teeth may also be provided on either end of the bearing cap in order to align the easily abutting edges of the semi-cylindrical alignment slots of the bearing cap and the saddle member and to prohibit transverse movement between the cap and the saddle member. In most such arrangements, pilot bolts are inserted into either end of the bearing cap and screwed into registering bores in or near the alignment slots of the saddle member in order to secure a mount at the ends of the bearing cap securely within the alignment slots of the saddle member.

Unfortunately, such prior art solutions to the misalignment problem are not without shortcomings. For example, the generally symmetrical shape of prior art bearing caps renders it very easy for a mechanic who disassembles such a bearing assembly to erroneously reassemble the bearing cap back over its respective saddle member with the ends of the bearing cap 180° reversed. If the axis of rotation of the semi-cylindrical alignment slot of the bearing cap is perfectly machined the same distance with respect to the vertical location surfaces on either end of the cap, then such a 180° reversable may be of no consequence. However, in more cases than not, such a mis-assembly of the bearing will result in wear-increasing misalignments. Still another shortcoming associated with prior art solutions is the number of precision guide surfaces and pilot holes which need to be machined to the ends of the bearing cap and saddle member in order to achieve the desired, precise alignment between the abutting edges of the semi-cylindrical recesses of the cap and saddle member.

Clearly, there is a need for a bearing assembly which may be disassembled, and unambiguously reassembled in order to maintain the precision alignment between the semi-cylindrical recesses of the cap and saddle member. Moreover, it would be desirable if such a structure required a minimal number of guide surfaces and pilot bores in order that it may achieve its function with a maximum of reliability, and a minimum of costly machining.

SUMMARY OF THE INVENTION

In its broadest sense, the invention is an improved bearing assembly for journaling the crankshaft of the internal combustion engine which includes a bearing cap which may be assembled onto a saddle member in the engine block in only one possible orientation.

The saddle member of the engine block generally includes a shaft-receiving, semi-cylindrical recess which is flanked on either side by first and second alignment slots. The bearing cap of the assembly likewise includes a shaft-receiving, semi-cylindrical recess of the same diameter as the semi-cylindrical recess of the saddle member, and first and second mounting shoulders on either of the sides which are insertable within the first and second alignment slots of the saddle member. However, the first shoulder is not insertable within the second alignment slot in order to provide only one possible fitting orientation between the first and second mounting shoulders of the bearing cap, and the first and second alignment slots of the saddle member.

The first and second shoulders of the bearing cap may be asymmetrical with respect to the axis of rotation of the semi-cylindrical recess present in the cap. The asymmetrical shoulders may each be generally rectangular in the shape, with one shoulder extending further laterally than the other. Additionally, the first and second shoulder-receiving alignment slots of the saddle member may be generally complementary in shape. The shorter and longer rectangular shoulders of the bearing cap, so that the longer rectangular shoulder is non-mateable with the shorter complementary alignment slot of the saddle member which normally receives the shorter rectangular shoulder of the bearing member.

The outer edges of the first and second shoulders may include vertical location surfaces which are engageable within guide surfaces located at the extremities of the first and second alignment slots in order to accurately align the location abutting edges of the semi-cylindrical recesses of the saddle member and the bearing cap. The vertical location surfaces and the guide surfaces which engage them when the bearing cap is fitted over the saddle member may be shaped so as to prevent relative movement between the bearing cap and the saddle member when one of these shoulders is fixedly mounted to its respective alignment slot. When such conditions exist, only a single pilot bolt through either one of the shoulders of the bearing cap is necessary to accurately align the abutting edges of the semi-cylindrical recesses of the saddle member and the bearing cap, and to prevent any relative motion between the bearing cap and the saddle member fore and aft of the engine. In such a case, the assembly between the bearing cap and the saddle member may be completed by a second bolt which merely serves to clamp the other shoulder securely within its respective alignment slot, but need not serve any pilot or guiding function between this shoulder and its alignment slot.

The asymmetrical shoulders of the bearing cap and the interaction between the vertical location surfaces of these shoulders and the guide surfaces which define the edges of their respective alignment slots provides an improved bearing assembly which may only be assembled when the abutting edges of the semi-cylindrical recesses of the saddle member and bearing cap are properly aligned with respect to one another, and which requires a minimum of precision-machine guide surfaces and pilot bolts.

BEST MODE FOR CARRYING OUT THE INVENTION

Figure 1:
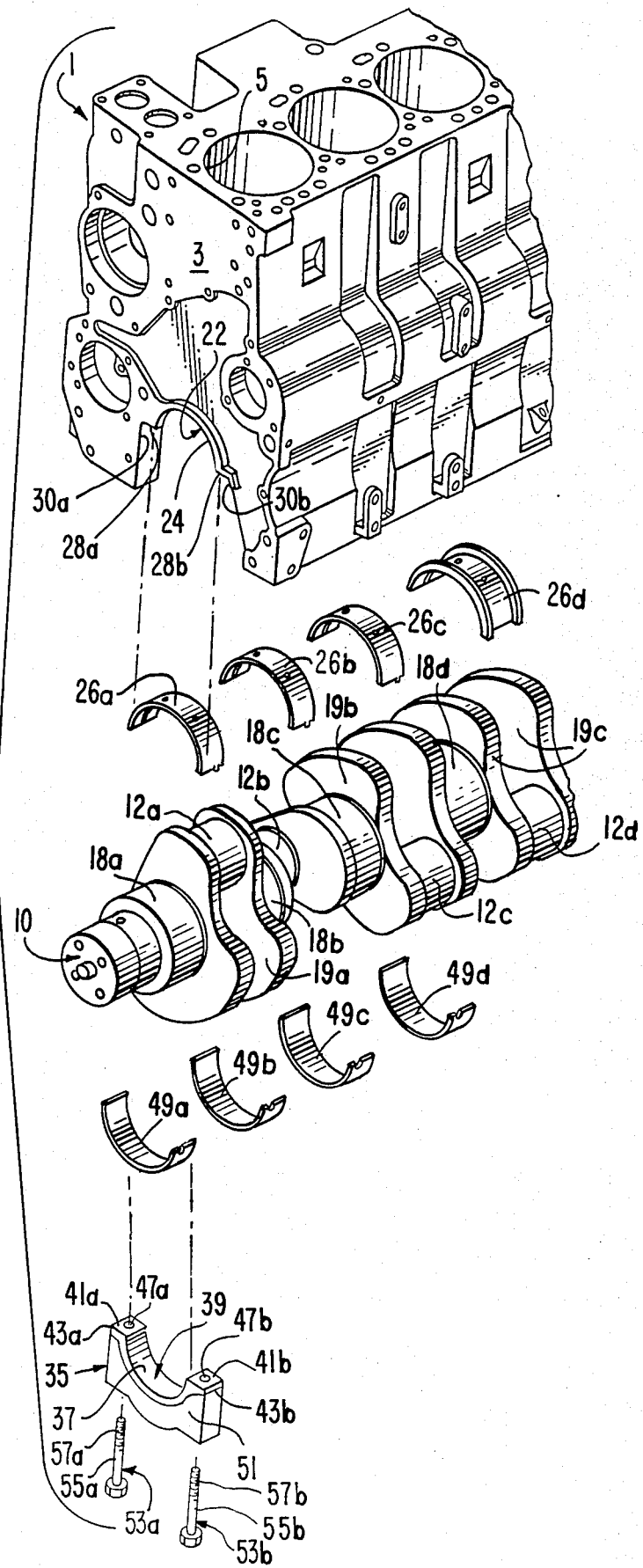
FIG. 1 is an exploded view of the bearing assembly of the invention, demonstrating how it mounts the crankshaft into the engine block of an internal combustion engine.
Figure 2:
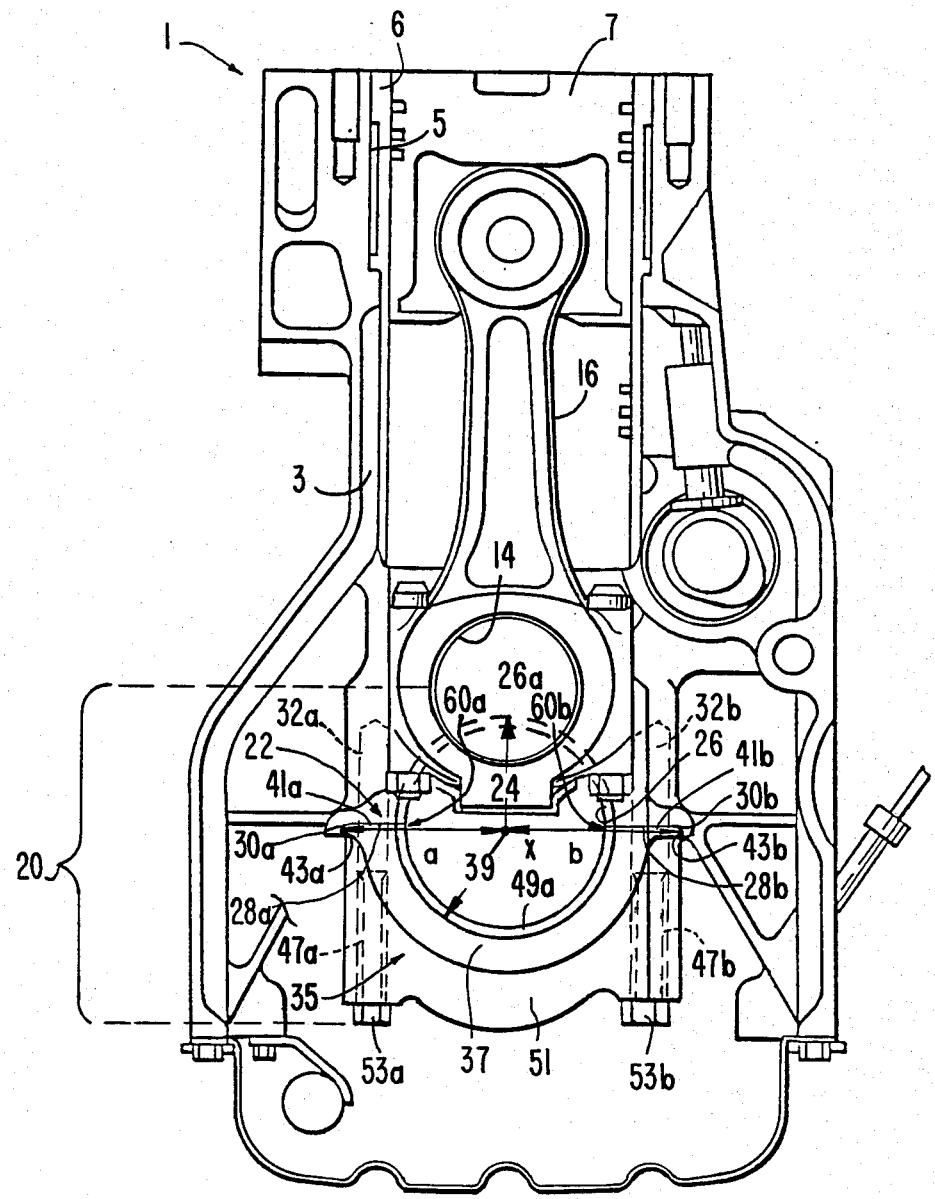
FIG. 2 is a partial cross-sectional front view of the engine illustrated in FIG. 1, with the crankshaft removed in order to illustrate how the bearing assembly of the invention is mounted within the engine block.

With reference to FIGS. 1 and 2, wherein like numerals designate like components throughout all the several figures, the bearing assembly 20 of the invention finds particular application in journaling the crankshaft 10 of the diesel engine 1. Such engines 1 generally include an engine block 3 having a plurality of piston receiving bores 5 for receiving a liner 6 and piston 7 which reciprocates therein. The diesel engine 1 further includes a crankshaft 10 having cranks 12a through 12d which are rotatably mounted by bearings 14 to the lower ends of the piston rods 16. While only three cranks are illustrated in FIG. 1, crankshaft 10 is designed for a six cylinder engine and has a total of six cranks. The crankshaft 10 further includes a plurality of main journals 18a–18d with one end extending outside of the engine block to form an output shaft for the engine 2. The crankshaft 10 converts the reciprocatory motion of the pistons 7 into rotary motion in a manner well known in the mechanical arts. In order to help balance the intense radial forces which the piston rod 16 apply to main journals 18a–18d through the cranks 12a–12d, the crankshaft 10 includes a series of counterweights 19a–19c as shown.

However, despite the provision of the counterweights 19a–19c, the main journals 18a–18d must be supported with a minimum clearance to permit the formation of a lubricant film between the main journals 18a–18d and the remainder of the bearing assembly 20.

Figure 3:
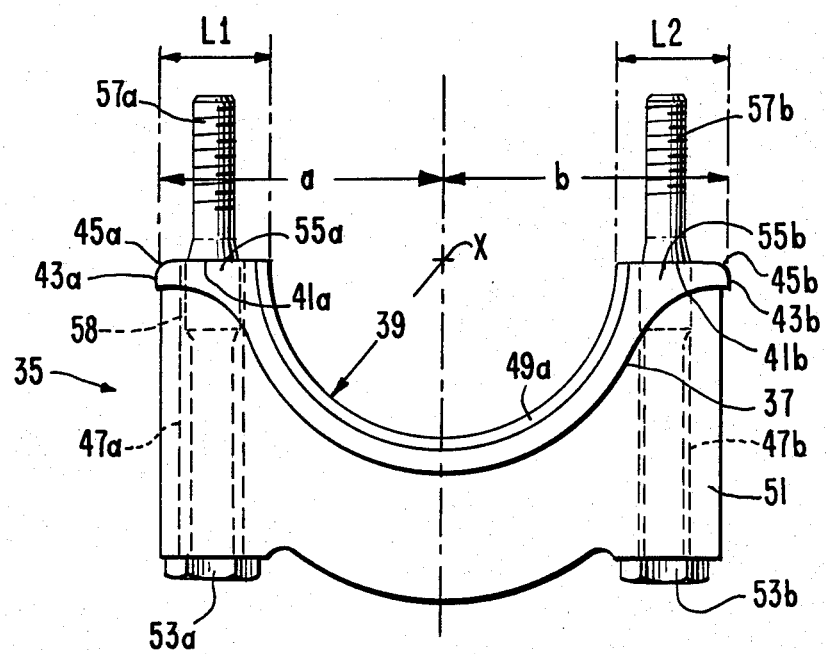
FIG. 3 is a side view of the bearing cap of the invention, and the pilot bolts which mount it onto the saddle member of the bearing assembly.

Bearing assembly 20 is formed from four principle components, including a saddle member 22, which may be integrally formed within the engine block 3, and bearing cap 35. Saddle member 22 includes a centrally disposed, semi-cylindrical recess 24 as shown for receiving a semi-cylindrical bearing shell 26a which, in turn, receives the upper half of the main journal 18a of the crankshaft 10. Disposed on either side of the semi-cylindrical recess 24 are shoulder-receiving alignment slots 28a and 28b. The edges of these alignment slots 28a and 28b are defined by precision machined guide surfaces 30a and 30b which are preferably linear as indicated. Centrally disposed within the face of each of the alignment slots 28a and 28b is a bore 32a and 32b for receiving a pilot bolt 53a and 53b, respectively. Turning now to the FIGS. 2 and 3, the bearing cap 35 includes a cradle member 37 which is preferably integrally formed with cap support member 51. Cradle member 37 includes a semi-cylindrical recess 39 which is precision-machined to the same radial dimensions as the previously discussed semi-cylindrical recess 24 of the saddle member 22. Disposed on either side of recess 39 are rectangular shoulders 41a and 41b. In the preferred embodiment, the lateral dimension of L1 and L2 of the shoulders 41a and 41b are deliberately chosen to be unequal, in order to provide only one fitting orientation of the bearing cap 35 within the alignment slots 28a and 28b of the saddle member 22 in which recesses 24 and 39 will properly meet as illustrated in FIG. 2. However, while rectangular shoulders of different lengths L1 and L2 constitute the preferred embodiment of the invention, it should be noted that any pair of opposing shoulders which are asymmetrical with respect to the center axis of curvature or axis x of the semi-cylindrical recess 39 fall within the purview of the invention. Stated differently, one of the principle conditions of the invention will be fulfilled if the radial distance a from the axis of central axis x is different than b.

Figure 4:
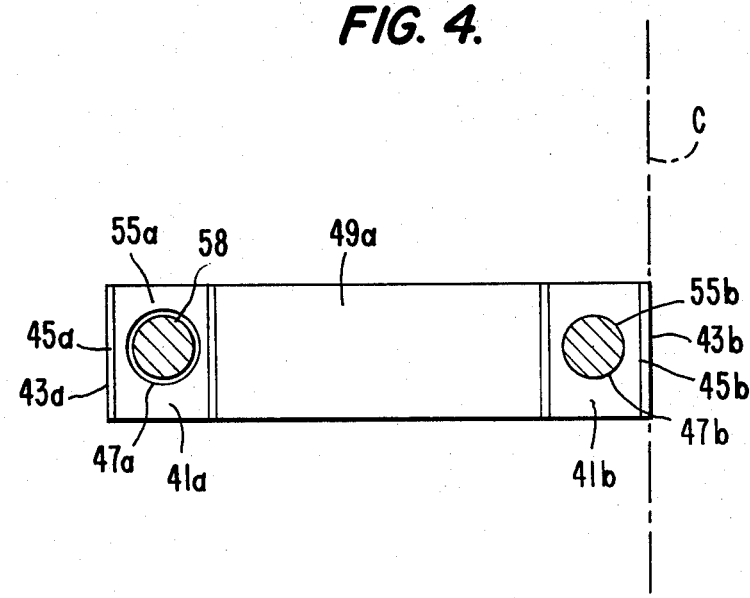
FIG. 4 is a top planed view of the bearing cap and pilot bolts illustrated in FIG. 3.

Shoulders 41a and 41b of the bearing cap 35 preferably terminate in vertical locating surfaces 43a and 43b. In order to facilitate the insertion of these locating surfaces 43a and 43b into their respective alignment slots 28a and 28b, bevels 45a and 45b are provided on the upper corners of the shoulders 41a and 41b. As is best seen with respect to FIGS. 1, 3 and 4, the semi-cylindrical recess 39 of the bearing cap 35 receives a bushing shell 49a which is essentially identical to the previously discussed bushing shell 26a. Opening into the upper faces of each of the shoulders 41a and 41d is a bolt receiving bore 47a and 47b. These bores 47a and 47b are mutually registerable with the previously discussed bores 32a and 32b opening into the lower faces of the alignment slots 28a and 28b. The balance of the bearing assembly 20 consists of the identical pilot bolts 53a and 53b which pass through bores 47a and 47b, respectively, and are threaded into bores 32a and 32b respectively. When tightened, bolts 53a and 53b bias the upper faces of the shoulders 41a and 41b firmly against the lower faces of the alignment slots 28a and 28b in the saddle member 22. Each of the bolts 53a and 53b includes a precision machined pilot shank 55a and 55b as well as a threaded portion 57a and 57b which is engageable within the threads (not shown) of the bores 32a and 32d contained saddle member 22.

During a bearing reassembly operation, the different lateral extent of shoulders 41a and 41b will prevent the bearing cap 35 from being mounted onto the saddle member 22 with shoulder 41a being received in alignment slot 28b and shoulder 41b being received in alignment slot 28a. Accordingly, the provision of shoulders 41a and 41b of different lengths L1 and L2 (which differ by about one millimeter in the preferred embodiment) provides a bearing assembly 20 which may only be fitted together in one orientation. Additionally, when the bearing assembly is properly fitted together, the engagement of the vertical locating surfaces 43a and 43d with the precision machined guide surfaces 30a and 30d of the saddle member 22 precisely aligns the abutting edges 60a and 60b (FIG. 2) of the semi-cylindrical recesses 24 and 39 of the saddle member 22 and bearing cap 35, respectively. Finally, because the engagement of the linear, vertical locating surfaces 43a and 43b against the linear guide surfaces 30a and 30b of the saddle member 22 prohibits any transverse movement between the saddle member 22 and the bearing cap 35, only one of the two sets of mutually registerable bores 32a, 47a and 32b, 47b need be precision-machined with respect to the pilot shank of its respective bolt. This is best understood with specific reference to FIGS. 3 and 4. Only bore 47a is precision-machined with respect to the pilot shank 55b of the bolt 53b. A small annular clearance 58 exists between the pilot shank 55a and surrounding bore 47a. However, since the edges of the shoulders 41a and 41d are firmly clamped between the guide surfaces 30a and 30b of the alignment slots 28a and 28b, any relative lateral movement between the bearing cap 35 and the saddle member 22 is prevented. Additionally, the precision fit between the bore 47b and the pilot shank 55b of the bolt 53b, in combination with the firm abuttment of the vertical locating surface 43b against the linear guide surface 30b (whose position is indicated by phantom line c) prevents any relative pivoting or twisting movement between the bearing cap 35, and the saddle member 22. Accordingly, only one precision-machined set of mutually registering bores 47b, 32b may be included in the bearing assembly 20 in order to firmly secure and to maintain alignment between the bearing cap 35 and the saddle member 22.

Although the present invention has been described with respect to a preferred embodiment, it should be understood that the invention is not limited to the details thereof. A number of possible substitutions and modifications have been suggested in the foregoing detailed description and others will occur to those of ordinary skill in the art. All such substitutions and modifications are intended to fall within the scope of the invention as defined in the appended claims.

We claim:

1. An improved bearing assembly for journaling a shaft of the type including a saddle member and a bearing cap, each of which includes shaft-receiving, semi-cylindrical recesses whose ends are mutually alignable to define a shaft-receiving cylindrical bore when the saddle member and bearing cap are assembled together, wherein the improvement comprises mounting shoulders on either end of the bearing cap which are receivable within alignment slots on either side of the shaft-receiving recess of the saddle member of generally the same shape as the shoulders they receive, with the mounting shoulders are unsymmetrical in shape relative to the axis of rotation of the semi-cylindrical recess of the bearing cap in order to provide only one possible fitting orientation between the mounting shoulders and the alignment slots of the saddle member which receive them when said member and cap are assembled, wherein said bearing cap contains a first bore opening into one of said shoulders which is aligned with a second bore contained in said saddle member when said saddle member and bearing cap are fitted together, and a first bolt having a pilot portion whose outer diameter is formed to mate with the inner diameter of said bore for providing proper positioning of the saddle member and the bearing cap along the center of curvature of the respective semi-cylindrical recesses, and further including a third bore opening into the other of said shoulders which is aligned with a fourth bore contained in the saddle member when said saddle member and bearing cap are fitted together, and a second bolt whose diameter is less than the diameter of the third bore for clamping said other shoulder into said alignment slot and thereby completing the assembly of the bearing.

2. A bearing assembly as defined in claim 1, wherein each of the mounting shoulders terminates at least in part in a vertical locating surface, and wherein the extremities of each of the shoulder receiving alignment slots of the saddle member is defined at least in part by a guide surface which engages the vertical locating surfaces of the mounting shoulders when the bearing cap is assembled to the saddle member in order to accurately align the abutting edges of the semi-cylindrical recesses in the saddle member and bearing cap.

3. A bearing assembly as defined in claim 1, wherein one of said shoulders is longer than the other at every point along its width.

4. A bearing assembly as defined in claim 3, wherein both of said shoulders are rectangular in shape.

5. A bearing assembly as defined in claim 3, wherein each of the mounting shoulders terminates in an edge which is substantially parallel with the center of curvature of said semi-cylindrical recesses of the saddle member and the bearing cap, and wherein each is defined by a vertical locating surface, and wherein the extremities of each of the shoulder receiving alignment slots of the saddle member is defined by a guide surface which engages the vertical locating surfaces of the mounting shoulders when the bearing cap is assembled to the saddle member in order to accurately align the abutting edges of the semi-cylindrical recesses in the saddle member and bearing cap.

6. An improved bearing assembly for journaling the crankshaft of an internal combustion engine, comprising:
(a) a saddle member mounted in the block of the engine having a main journal receiving, semi-cylindrical recess which is flanked on either side by first and second alignment slots, and
(b) a bearing cap having a main journal receiving, semi-cylindrical recess whose edges are alignable with the edges of the semi-cylindrical recess of the saddle member, and first and second mounting shoulders on either side which are insertable within said first and second alignment slots, wherein said edges are alignable in only one orientation between the first and second mounting shoulders of the bearing cap and the first and second alignment slots of the saddle member, wherein the outer edges of said first and second alignment slots include guide surfaces, and the outer edges of the first and second shoulders include vertical location surfaces which engage the guide surfaces of the first and second alignment slots when the bearing assembly is assembled in order to accurately align the abutting edges of the semi-cylindrical recesses of the saddle member and bearing cap.

7. A bearing assembly as defined in claim 6, wherein said first and second shoulders and said first and second alignment slots are substantially complementary in shape in order to prevent relative movement between the bearing cap and the saddle member when said cap and saddle member are assembled together.

8. A bearing assembly as defined in claim 6, wherein said engageable guide surfaces and locating surfaces also function to prevent relative movement between the bearing cap and the saddle member when said first shoulder is fixedly mounted within said first alignment slot.

9. A bearing assembly as defined in claim 8, further including a pilot bolt for fixedly mounting said first shoulder within said first alignment slot.

10. A bearing assembly as defined in claim 6, wherein said first and second shoulders are of unsymmetrical shapes relative to the axis of rotation of the semi-cylindrical recess of said bearing cap.

11. A bearing assembly as defined in claim 10, wherein said first and second shoulders are rectangles of different lengths.

* * * * *